(12) United States Patent
Chung et al.

(10) Patent No.: US 10,062,896 B2
(45) Date of Patent: Aug. 28, 2018

(54) METHOD OF MANUFACTURING SECONDARY BATTERY

(71) Applicant: LG Chem, Ltd., Seoul (KR)

(72) Inventors: Mikyung Chung, Daejeon (KR);
Sung-Kyun Chang, Daejeon (KR);
Soojin Kim, Daejeon (KR); In Sung Uhm, Daejeon (KR); Won Seok Chang, Daejeon (KR)

(73) Assignee: LG Chem, Ltd. (KR)

( * ) Notice: Subject to any disclaimer, the term of this patent is extended or adjusted under 35 U.S.C. 154(b) by 39 days.

(21) Appl. No.: 14/420,997

(22) PCT Filed: Nov. 8, 2013

(86) PCT No.: PCT/KR2013/010106
§ 371 (c)(1),
(2) Date: Feb. 11, 2015

(87) PCT Pub. No.: WO2014/073899
PCT Pub. Date: May 15, 2014

(65) Prior Publication Data
US 2015/0236335 A1 Aug. 20, 2015

(30) Foreign Application Priority Data

Nov. 8, 2012 (KR) .......... 10-2012-0125809
Nov. 8, 2013 (KR) .......... 10-2013-0135251

(51) Int. Cl.
*H01M 2/36* (2006.01)
*H01M 10/052* (2010.01)
*H01M 2/02* (2006.01)

(52) U.S. Cl.
CPC ......... *H01M 2/362* (2013.01); *H01M 2/0237* (2013.01); *H01M 10/052* (2013.01); *H01M 2220/20* (2013.01); *Y10T 29/49115* (2015.01)

(58) Field of Classification Search
CPC .. H01M 2/362; H01M 2/0237; H01M 10/052; H01M 2220/20
See application file for complete search history.

(56) References Cited

U.S. PATENT DOCUMENTS 2,996,038 A * 8/1961 Hunicke ............... H01G 13/04
118/423
6,589,694 B1 * 7/2003 Gosho ............... C01G 45/1228
429/212

(Continued)

FOREIGN PATENT DOCUMENTS

CN  102612767 A  7/2012
JP  H03-53448 A  3/1991

(Continued)

OTHER PUBLICATIONS

International Search Report for Application No. PCT/KR2013/010103 dated Jan. 22, 2014.

(Continued)

*Primary Examiner* — Ula C Ruddock
*Assistant Examiner* — Matthew W Van Oudenaren
(74) *Attorney, Agent, or Firm* — Lerner, David, Littenberg, Krumholz & Mentlik, LLP

(57) ABSTRACT

Disclosed is a method of manufacturing a secondary battery, built in a battery case, having an electrode assembly impregnated with an electrolyte solution, the method including:
(a) injecting an electrolyte solution into a chamber;
(b) impregnating by soaking an electrode assembly, which has a separator interposed between a cathode and an anode, in an electrolyte solution contained in the chamber; and
(c) moving into the electrode assembly from step (b) with the electrolyte solution into a battery case,
whereby interfacial wetting of the electrode assembly and the electrolyte solution is improved.

(Continued)

A secondary battery manufactured according to the method may have improved electrolyte solution impregnation properties, ionic conductivity, electronic conductivity and the like and, as such, may have improved electrochemical performance.

3 Claims, 1 Drawing Sheet

(56) References Cited

U.S. PATENT DOCUMENTS

| | | | |
|---|---|---|---|
| 2002/0031710 A1* | 3/2002 | Kezuka | H01M 10/0565 429/303 |
| 2002/0106554 A1 | 8/2002 | Nemoto et al. | |
| 2004/0068863 A1 | 4/2004 | Cintra et al. | |
| 2004/0139587 A1* | 7/2004 | Sato | H01G 9/038 29/25.03 |
| 2007/0209584 A1 | 9/2007 | Kalynushkin et al. | |
| 2008/0166637 A1* | 7/2008 | Inagaki | H01M 4/366 429/329 |
| 2010/0173187 A1 | 7/2010 | Nishikawa et al. | |
| 2010/0209782 A1 | 8/2010 | Choi et al. | |
| 2011/0097630 A1* | 4/2011 | Choi | H01M 2/0257 429/246 |
| 2012/0034531 A1 | 2/2012 | Senda et al. | |
| 2013/0065111 A1 | 3/2013 | Kim et al. | |

FOREIGN PATENT DOCUMENTS

| | | |
|---|---|---|
| JP | 10-050296 A | 2/1998 |
| JP | 1998-050296 | 2/1998 |
| JP | 2006-294282 A | 10/2006 |
| JP | 2007096048 * | 4/2007 |
| JP | 2007096048 A | 4/2007 |
| KR | 20000061587 A | 10/2000 |
| KR | 100528900 B1 | 11/2005 |
| KR | 20070082927 A | 8/2007 |
| KR | 20110101331 A | 9/2011 |
| KR | 101134122 B1 | 4/2012 |
| KR | 20120033647 A | 4/2012 |

OTHER PUBLICATIONS

International Search Report for Application No. PCT/KR2013/010105 dated Jan. 22, 2014.

International Search Report for Application No. PCT/KR2013/010106 dated Jan. 22, 2014.

* cited by examiner

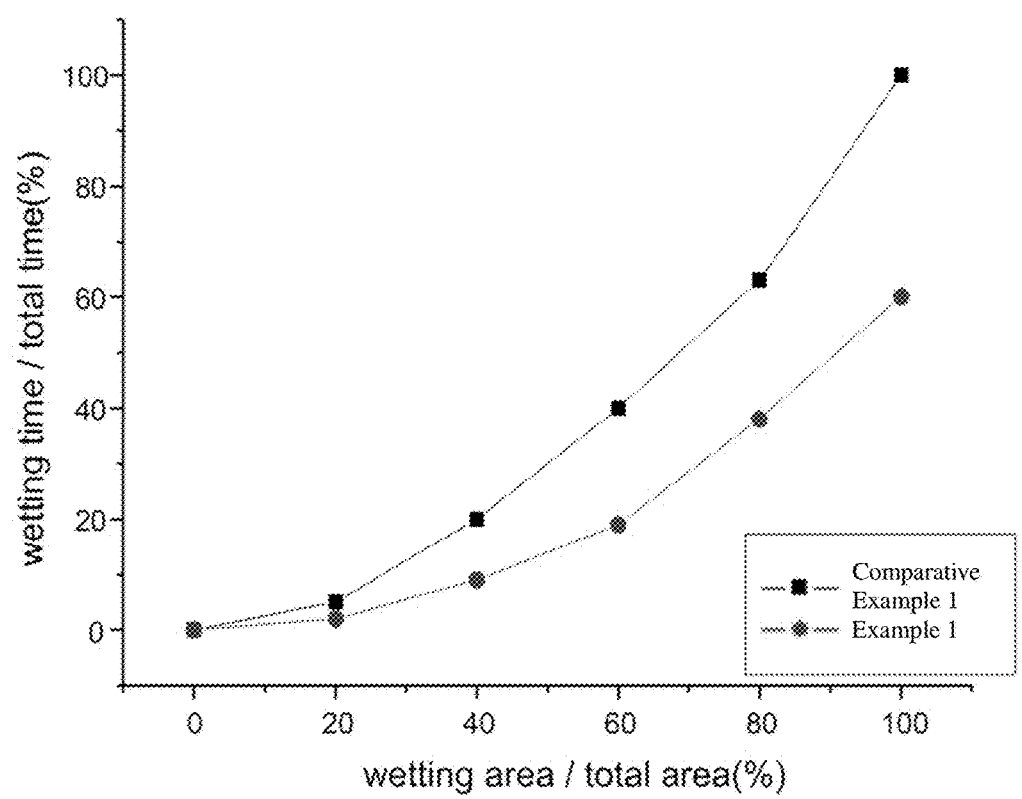

METHOD OF MANUFACTURING SECONDARY BATTERY

CROSS-REFERENCE TO RELATED APPLICATION

This application is a national phase entry under 35 U.S.C. § 371 of International Application No. PCT/KR2013/010106, filed Nov. 8, 2013, which claims priority to Korean Patent Application No. 10-2012-0125809, filed on Nov. 8, 2012, and Korean Patent Application No. 10-2013-0135251, filed on Nov. 8, 2013, the disclosures of which are incorporated herein by reference.

TECHNICAL FIELD

The present invention relates to a method of manufacturing a secondary battery, built in a battery case, having an electrode assembly impregnated with an electrolyte solution, the method including:

(a) injecting an electrolyte solution into a chamber;

(b) impregnating by soaking an electrode assembly, which has a separator interposed between a cathode and an anode, in an electrolyte solution contained in the chamber; and (c) moving the electrode assembly with the electrolyte solution into a battery case, whereby interfacial wetting of the electrode assembly and the electrolyte solution is improved.

BACKGROUND ART

As mobile device technology continues to develop and demand therefor continues to increase, demand for secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some lithium secondary batteries are commercially available.

A lithium secondary battery has a structure in which an electrode assembly, in which a porous separator is interposed between a cathode and an anode, each of which includes an active material coated on an electrode current collector, is impregnated with a lithium salt-containing non-aqueous electrolyte solution.

A general lithium secondary battery assembly process is performed by finally injecting an electrolyte solution into a battery case after alternately stacking a cathode, an anode and a separator and then inserting the cathode, the anode and the separator into the battery case made of a can or a pouch having a certain size and shape. Here, the finally injected electrolyte solution infiltrates a cathode, an anode and a separator by capillary force. However, due to material characteristics such as a cathode, an anode and a separator which are hydrophobic, and an electrolyte solution which is hydrophilic, substantial time and a difficult process are required until an electrode and a separator are wetted with an electrolyte solution.

In addition, devices or equipment are being enlarged and thereby volume, into which an electrolyte solution is infiltrated, is reduced and area, into an electrolyte solution is infiltrated, increases, and, accordingly, there is a high possibility that an electrolyte solution does not enter into a battery and locally exists outside. The amount of an electrolyte solution in a battery manufactured according to such a process battery is partially insufficient, and thereby battery capacity and performance are dramatically reduced.

To improve electrode wetting properties, methods such as injecting an electrolyte solution at high temperature, injecting an electrolyte solution at added or reduced pressure, or the like are used. However, when the methods are used, an electrode assembly and an electrolyte solution may be transformed and thereby problems such as internal short circuit and the like may occur.

Therefore, there is an urgent need for a method of manufacturing a secondary battery having stability at high temperature and improved wetting properties.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a secondary battery is manufactured including a step moving a battery case after impregnating an electrode assembly by injecting an electrolyte solution into a chamber, desired effects may be obtained, thus completing the present invention.

Technical Solution

In accordance with one aspect of the present invention, provided is a method of manufacturing a secondary battery, built in a battery case, having an electrode assembly impregnated with an electrolyte solution, the method including:

(a) injecting an electrolyte solution into a chamber;

(b) impregnating by soaking an electrode assembly, which has a separator interposed between a cathode and an anode, in an electrolyte solution contained the chamber; and (c) moving the electrode assembly with the electrolyte solution into a battery case, whereby interfacial wetting of the electrode assembly and the electrolyte solution is improved.

When impregnation is performed by inserting an electrode assembly into a conventional battery case and then injecting an electrolyte solution, an amount of an electrolyte solution limited by a size of each of battery cases is injected thereinto. Accordingly, it takes long time to impregnate the whole of the electrode assembly and the electrode assembly may be insufficiently impregnated.

Accordingly, in the manufacturing method according to the present invention, the electrode assembly is impregnated in a chamber containing a large amount of an electrolyte solution, and thus impregnation properties of an electrode assembly, such as an impregnation rate and the like may be improved and, at the same time, manufacturing processability may be improved in that a plurality of electrode assembles may be impregnated at once.

That is, the manufacturing method according to the present invention includes moving the electrode assembly and the electrolyte solution into the battery case after impregnating the electrode assembly by injecting the electrolyte solution into a separate chamber. Accordingly, mobility of electrolyte materials may be increased, thereby improving interfacial wetting, namely, wettability, of the electrode assembly and the electrolyte solution.

In addition, in the present invention, a volume of the chamber may be 1.5 times or more, particularly 2 times or more, maximally 10 times, with respect to a volume of the electrode assembly. Accordingly, the electrode assembly may be quickly and sufficiently impregnated in the chamber containing a large amount of the electrolyte solution.

That is, since the chamber impregnates the electrode assembly, impregnation properties such as an impregnation rate of the electrode assembly may be improved and, at the same time, a plurality of electrode assemblies may be impregnated at once, thereby improving processability.

Viscosity of the electrolyte solution may be 0.1 cP to 5 cP, particularly 1 cP to 4 cP. By the manufacturing method according to the present invention, even when the viscosity of the electrolyte solution is high, impregnation properties of the electrolyte solution are improved and thus interfacial wetting between the electrode assembly and the electrolyte solution may be improved. However, an electrolyte solution having viscosity exceeding 5 cP is not preferable since mobility of electrolyte materials may not be maximized.

The present invention provides a secondary battery manufactured according to the method.

Such a secondary battery may be particularly a lithium secondary battery.

Hereinafter, constituents of such a lithium secondary battery will be described.

The lithium secondary battery includes a cathode fabricated by drying and pressing after coating a mixture of a cathode active material, a conductive material and a binder on a cathode collector, and an anode fabricated in the same manner. In this case, as desired, the mixture may further include a filler.

The cathode current collector is generally fabricated to a thickness of 3 to 500 μm. The cathode current collector is not particularly limited so long as it does not cause chemical changes in the fabricated battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

As the cathode active material, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0 \leq x \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; $Fe_2(MoO_4)_3$; and $LiNi_xMn_{2-x}O_4$ where $0.01 \leq x \leq 0.6$ may be used.

The conductive material is typically added in an amount of 1 to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The anode current collector is generally fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, silver, or the like, or aluminum-cadmium alloys. Similar to the cathode current collector, the anode current collector may also have fine irregularities at a surface thereof to increase adhesion between the anode active material and the anode current collector. In addition, the anode current collector may be used in any of various forms including films, sheets, foils, nets, porous structures, foams, and non-woven fabrics.

Examples of the anode active material include metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

Such a lithium secondary battery may be structured such that an electrode assembly having a separator interposed between a cathode and an anode is impregnated with a lithium salt-containing electrolyte solution.

The separator is disposed between the cathode and the anode and an insulating thin film having high ion permeability and mechanical strength is used as the separator. The separator typically has a pore diameter of 0.01 to 10 µm and a thickness of 5 to 300 µm. As the separator, sheets or non-woven fabrics made of an olefin polymer such as polypropylene, glass fibers or polyethylene, which have chemical resistance and hydrophobicity, are used. When a solid electrolyte such as a polymer is used as the electrolyte, the solid electrolyte may also serve as a separator.

The lithium salt-containing electrolyte solution includes an electrolyte solution and a lithium salt as described above, and the electrolyte solution may be a non-aqueous organic solvent, an organic solid electrolyte, an inorganic solid electrolyte, or the like. However, the present invention is not limited thereto.

For example, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte solution. In some cases, in order to impart incombustibility, the electrolyte solution may further include a halogen-containing solvent such as carbon tetrachloride and ethylene trifluoride. In addition, in order to improve high-temperature storage characteristics, the electrolyte solution may further include carbon dioxide gas, fluoro-ethylene carbonate (FEC), propene sultone (PRS), or the like.

In a preferred embodiment, a lithium salt-containing non-aqueous electrolyte solution may be prepared by adding a lithium salt such as $LiPF_6$, $LiClO_4$, $LiBF_4$, $LiN(SO_2CF_3)_2$, or the like to a mixed solvent of a cyclic carbonate such as EC or PC, which is a high dielectric solvent, and a linear carbonate such as DEC, DMC, or EMC, which is a low-viscosity solvent.

A battery pack including the lithium secondary battery may be used as a power source of vehicles that require high-temperature stability, long cycle characteristics, high rate characteristics, and the like.

Examples of the vehicles include electric vehicles (EVs), hybrid electric vehicles (HEVs), plug-in hybrid electric vehicles (PHEVs), and the like, but the present invention is not limited thereto.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph illustrating electrolyte solution impregnation time according to an area of an electrode assembly according to Experimental Example 1.

MODE FOR INVENTION

Now, the present invention will be described in more detail with reference to the following examples. These examples are provided only for illustration of the present invention and should not be construed as limiting the scope and spirit of the present invention.

Example 1

A porous separator was interposed between a cathode including a cathode active material and an anode including an anode active material to manufacture an electrode assembly. Subsequently, a non-aqueous lithium electrolyte solution including ethylene carbonate and ethylmethyl carbonate mixed in a volumetric ratio of 3:7, and 1 M $LiPF_6$ as a lithium salt was prepared. After impregnating the electrode assembly by injecting the electrolyte solution into a chamber and then soaking the electrode assembly in the electrolyte solution, the electrode assembly and the electrolyte solution were moved to a battery case together and then sealed, resulting in completion of a secondary battery.

Comparative Example 1

A secondary battery was manufactured in the same manner as in Example 1, except that an electrode assembly was impregnated by inserting an electrode assembly manufactured according to Example 1 into a battery case and then injecting an electrolyte solution thereinto.

Experimental Example 1

In each of Example 1 and Comparative Example 1, time taken to impregnate a total area of the electrode assembly after injecting the electrolyte solution into the chamber was measured. Results are illustrated in FIG. 1 below.

As shown in FIG. 1 below, it can be confirmed that, in the secondary battery according to Example 1, time taken to impregnate a total area of to the electrode assembly is relatively faster, when compared to the secondary battery according to Comparative Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since a method of manufacturing a secondary battery according to the present invention includes moving an electrode assembly to a battery case after impregnating the electrode assembly in a chamber containing a large amount of an electrolyte solution, an impregnation rate of the electrode assembly is increased and thus superior electrolyte solution impregnation properties are exhibited. At the same time, a plurality of electrode assemblies may be impregnated at once and thus battery processability may be improved. In particular, the manufacturing method according to the present invention may be effectively used in an electrode assembly including high-load electrode or a plurality of electrode units having relatively low electrolyte solution impregnation properties.

The invention claimed is:

1. A method of manufacturing a secondary battery, built in a battery case, having an electrode assembly impregnated with an electrolyte solution, the method consisting of:
   injecting an electrolyte solution into a chamber;
   soaking an electrode assembly, which has a separator interposed between a cathode and an anode, in the electrolyte solution contained in the chamber;
   moving the electrode assembly with the electrolyte solution into a battery case; and
   sealing the battery case,
   wherein the electrolyte solution has a viscosity of 1 cP to 4 cP.

2. The method according to claim 1, wherein a volume of the chamber is 1.5 times or more with respect to a volume of the electrode assembly.

3. The method according to claim 1, wherein a volume of the chamber is 2 times or more with respect to a volume of the electrode assembly.

* * * * *